United States Patent [19]

Weisbrich, Jr.

[11] 3,873,984

[45] Mar. 25, 1975

[54] PASSIVE RANGING TECHNIQUE

[75] Inventor: Henry T. Weisbrich, Jr., China Lake, Calif.

[73] Assignee: The United States of America as represented by the Secretary of the Navy, Washington, D.C.

[22] Filed: Jan. 7, 1972

[21] Appl. No.: 216,301

[52] U.S. Cl. .......................... 343/112 D, 235/150.27
[51] Int. Cl. .............................................. G01s 5/14
[58] Field of Search ............. 343/112 D; 235/150.27

[56] References Cited
UNITED STATES PATENTS

| | | | |
|---|---|---|---|
| 3,090,957 | 5/1963 | Albanese et al. | 343/112 D |
| 3,378,842 | 4/1968 | Phillips | 343/112 D |
| 3,430,243 | 2/1969 | Evans | 343/112 D |
| 3,594,796 | 7/1971 | Earp | 343/112 D |
| 3,626,419 | 12/1971 | Earp | 343/106 D |
| 3,633,204 | 1/1972 | Earp | 343/112 D |

Primary Examiner—Maynard R. Wilbur
Assistant Examiner—Richard E. Berger
Attorney, Agent, or Firm—R. S. Sciascia; Roy Miller

[57] ABSTRACT

A passive ranging system based upon a method of determining a rate of change of the phase to an emitting source comprising a multiplicity of spaced sets of antennas at locations on a slow moving platform which in itself may be moving with respect ot the source and whereby the phase relationship will vary to each antenna.

3 Claims, 6 Drawing Figures

PASSIVE RANGING TECHNIQUE

CROSS REFERENCE TO RELATED APPLICATIONS

This application incorporates, by reference, the subject matter of co-pending U.S. application Ser. No. 216,300, filed Jan. 7, 1972, by Lloyd M. Smith, "PASSIVE RANGING TECHNIQUE," now U.S. Pat. No. 3,789,410.

BACKGROUND OF THE INVENTION

The present invention is concerned with a passive ranging system wherein the range of an emitting source may be computed and outputted accurately and very rapidly.

DESCRIPTION OF THE PRIOR ART

Prior methods of computing range to an emitting source have ordinarily involved a triangulation scheme. Triangulation schemes for determining range require taking readings at at least two separated points which induces a time factor. If a slow moving platform such as a ship is involved, the time required for triangulating may mean that the threat involved has attained its purpose before the range to the emitter can be ascertained.

SUMMARY OF THE INVENTION

In brief, the present invention involves placing sets of antennas at intervals along, for instance, the center line of a slow moving platform such as a ship. By taking samples over the length of the ship of the signal received from the emitting source, an implied velocity is induced. Therefore, it is as though the slow moving platform or ship were moving at a much high velocity than the actual velocity.

DESCRIPTION OF THE PREFERRED EMBODIMENT

Co-pending application Ser. No. 216,300 describes a method of passive ranging based upon determining the rate of change of the phase from the source of emission which is described as follows. When any two antennas intercept the same signal, they at any instance "see" the same frequency however, at different locations they "see" different phases of the signal. If the two antennas are moving in some direction with respect to the source, the phase relationship will vary to each antenna. The rate of change of the relative phase constitutes a new frequency which is dependent upon how fast the two antennas move, their separation, the signal frequency and the angle at which the two antennas are moving with respect to the source. The new signal, $d\theta/dt$, defined as F, may yield an estimate of the range to the source as exemplified by the following range equation:

$$R = nv \cos^2 \theta / F$$

Where $R$ = range in feet;

$n$ = separation of the antennas in number of wavelengths at the source signal frequency;

$v$ = velocity of the antennas;

$\theta$ = the angle off boresight where boresight is defined as a line perpendicular to the two antennas;

and $F = d\theta/dt$ of the original signal, ie, rate of change of in and out of phase relationship.

If an aircraft, for instance, were to have an antenna positioned on the nose and tail and they are spaced 30 feet apart, then at X-band frequency the separation would be 300 wavelengths. Further, for purposes of illustration, the aircraft is assumed to be flying at 600 ft/sec.

Figure 1:
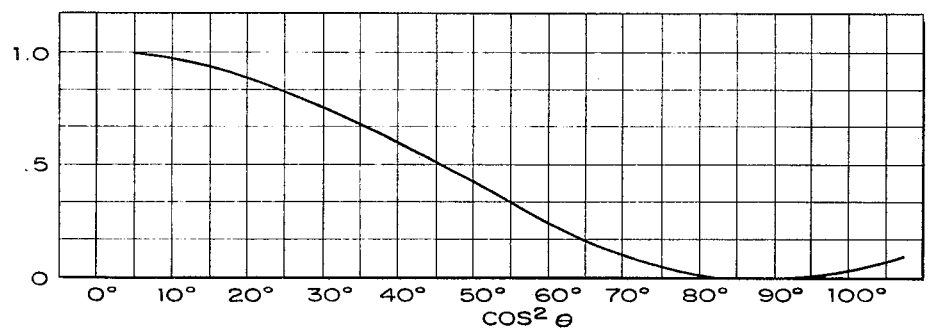
FIG. 1 is a graph of the plot of $\cos^2 \theta$.

For reference purposes the $\cos^2 \theta$ function of a received signal is set forth in FIG. 1.

Figure 2:
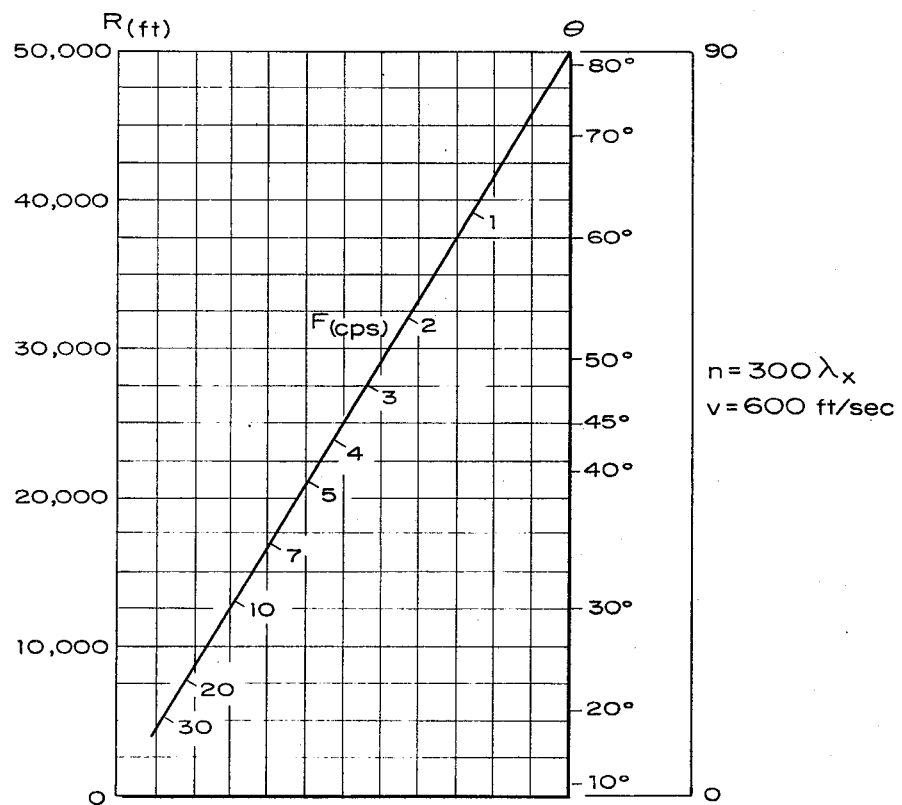
FIG. 2 is a graph illustrating the new variable frequency induced in the co-pending application.

The graph of FIG. 2 is a plot of the relative values that the new variable $f$ takes, assuming the conditions that prevail for illustration purposes above.

Figure 3:
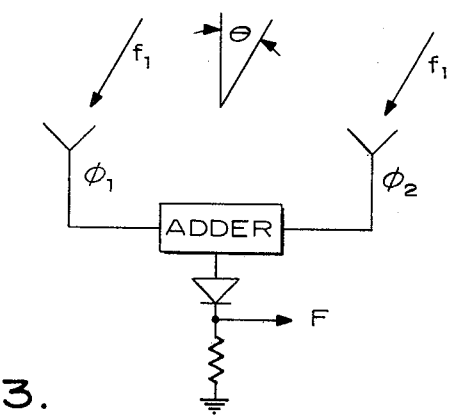
FIG. 3 is a simplified showing of the recovery system in the co-pending application.

The variable $F$ is recovered in the co-pending application, by a summation of the signals received on each antenna. The summing network is very schematically shown in FIG. 3. A complete system associated with one pair of antennas is set forth in the co-pending application.

The phases, $\phi_1$ and $\phi_2$ will add to equal an amplitude of voltage. If the two signals are in phase the resultant voltage is 2E, if the signals are out of phase the voltage is 0. When samples of the signal are taken at a pulse repetition frequency for 1 second a new frequency F is developed. The pulse repetition frequency provides the samples and an accounting of the frequency $F$, yields by processing, an estimate of range.

This is the basic technique for determining range when the possible separation of antennas and some velocity are the determining factors. Such a technique is effective when used on a high velocity platform used in illustrating the system of co-pending application Ser. No. 216,300. When such a scheme is considered on a slow moving platform, such as a ship, it is immediately seen that the velocity is very limited. However, a ship can provide a much better spearation of antennas. Further, if an item called "implied velocity" is added to the previous capability the technique can be considerably improved.

Figure 4:
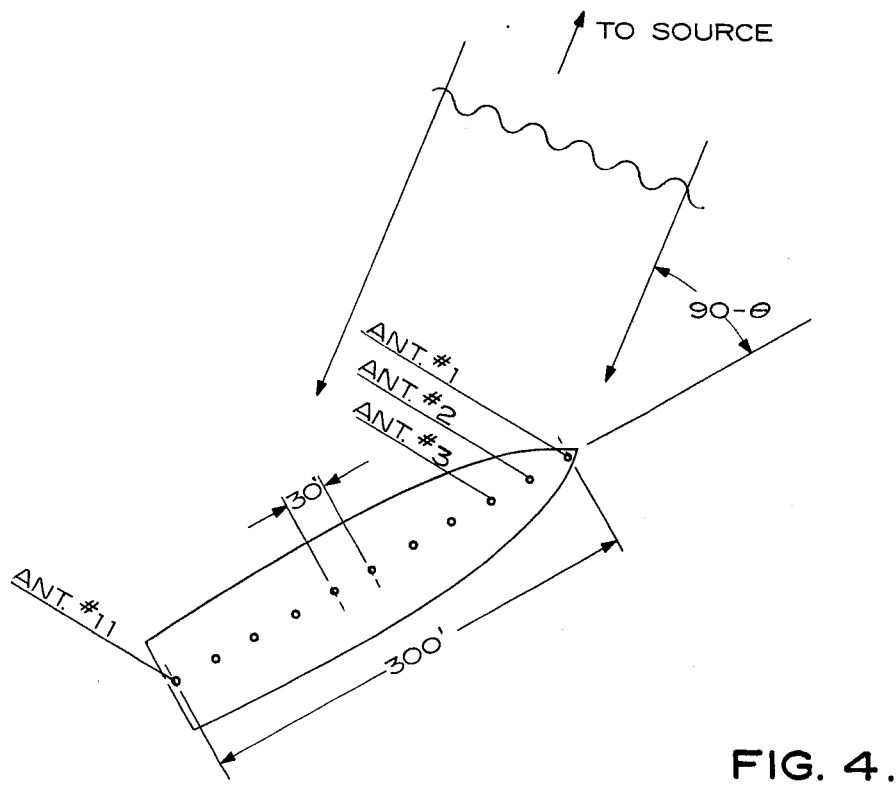
FIG. 4 is a simplified showing illustrating the present invention.

Now with reference to FIG. 4, assume that the ship is 300 feet long and a number of sets of antennas are positioned at 30 ft intervals along the ship in a straight line. Then, as shown in FIG. 4, a method is provided to propagate the signal along the ship.

Assume that the first sample of the signal is taken on antenna set comprising antennas 1 and 2 on one pulse, and at the next pulse the sample is taken on antennas 2 and 3 etc, etc.. In ten pulses, samples have been taken over the length of the ship. If the pulse repetition frequency is 1000 cycles per second, it has taken 0.01 second to sample the signal over the distance of 300 ft. This gives an implied velocity of 300 ft over 0.01 seconds or a velocity equal to 30,000 ft per sec.

Figure 5:
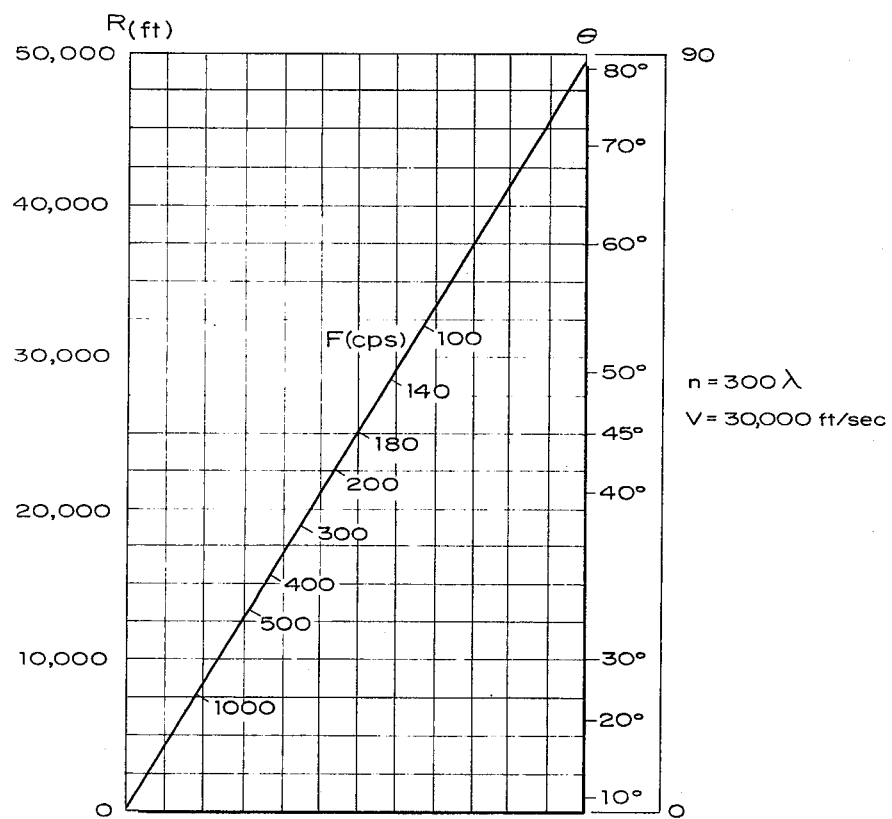
FIG. 5 is a graph illustrating the new variable frequency, F, induced by the present invention.

Again, looking at the equation: $R = nv \cos^2 \theta / F$, it is seen that n still is 300 wavelengths, $\theta$ is as before but now $v$ = 30,000 ft per sec., which considerably improves the input variables. The graph of FIG. 5 illustrates the new value of F derivable by the technique of the present invention.

Figure 6:
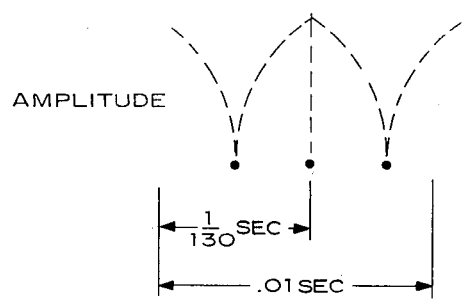
FIG. 6 is a graph of the new frequency, F, recovered.

Using this method, the frequency $F$ is recoverable and would appear as shown in FIG. 6. If in fact, recycling of the technique is used, confidence would be enhanced in recovering of the frequency $F$. Conceivably, the present technique could be carried one step further by developing a technique to sample on an intra pulse basis. This would depend upon switching between samples during the pulse time or during 0.1 to 1 microsecond, depending upon the pulse width. Such a technique would depend upon the reasonableness of switching capability. As an example, if the 10 samples were received during the pulse time and the pulse width were 1 microsecond long it would yield an implied velocity of $300 \times 10^6$ feet per second which at a 50,000 ft range would give a frequency $F$ of 1.8 megacycles. The same procedure of recycling the "array" for a few pulses would provide improved reconstruction or confidence in the 1.8 megacycles. Such a technique would yield an almost instantaneous estimate of range.

It is to be understood that any number of sets of antennas could be used and if the sampling were increased the reconstruction process would also improve. Also, it is to be noted that the actual velocity of the ship in either of the cases where the implied velocity is used would be so slight that it could be ignored, however, in any case it is adding to the velocity being used.

What is claimed is:

1. In a passive ranging system for use on a slow moving platform incorporating means for determining range to an emitting source which comprise at least two physically separated antenna means for receiving signals from a radiating source; receiver means operatively connected to said at least two antenna means for producing output video signals and intermediate frequency signals; time of arrival computing means operatively connected to said receiver means and receiving said video signals and measuring the difference in time of arrival between the signals received at said at least two antenna means and producing a signal corresponding to bearing to the source; phase rate computer means operatively coupled to the output of said receiver means for receiving the intermediate frequency signals therefrom and producing sum signal and a quadrature sum signal; means operatively connected to said phase rate computer means for computing a phase rate beat frequency; modifying means operatively receiving the bearing signal and modifying said bearing signal for various measured parameters; and combining means operatively connected to said modifying means and said phase rate computing means combining said modified bearing signal and said phase rate beat frequency and outputting a signal representative of range to the emitting source;

the improvement comprising a multiplicity of sets of receiving antennas at spaced intervals along the slow moving platform so that an induced velocity is added to the received signals.

2. The improvement as set forth in claim 1 wherein; said multiplicity of sets of receiving antennas are in a straight line along the slow moving platform.

3. The improvement as set forth in claim 1 wherein; the multipicity of said receiving antennas are effective to provide an induced and implied velocity in the received signals.

* * * * *